US011873681B2

(12) United States Patent
Pai

(10) Patent No.: US 11,873,681 B2
(45) Date of Patent: Jan. 16, 2024

(54) WINDOW BLIND AND METHOD FOR ASSEMBLING SLATS THEREOF

(71) Applicant: UNION WINNER INTERNATIONAL CO., LTD., Taipei (TW)

(72) Inventor: Ming-Tsung Pai, Caotun Township (TW)

(73) Assignee: UNION WINNER INTERNATIONAL CO., LTD., Taipei (TW)

( * ) Notice: Subject to any disclaimer, the term of this patent is extended or adjusted under 35 U.S.C. 154(b) by 174 days.

(21) Appl. No.: 16/589,628

(22) Filed: Oct. 1, 2019

(65) Prior Publication Data

US 2021/0087878 A1 Mar. 25, 2021

(30) Foreign Application Priority Data

Sep. 25, 2019 (TW) ................................ 108212704

(51) Int. Cl.
*E06B 9/303* (2006.01)
*E06B 9/326* (2006.01)

(52) U.S. Cl.
CPC .............. *E06B 9/303* (2013.01); *E06B 9/326* (2013.01)

(58) Field of Classification Search
CPC .......... E06B 9/303; E06B 9/326; E06B 9/382; E06B 9/384; E06B 9/386; E06B 9/30; E06B 9/38
See application file for complete search history.

(56) References Cited

U.S. PATENT DOCUMENTS

| | | | | |
|---|---|---|---|---|
| 5,207,590 A * | 5/1993 | Benda | .................... H01H 85/24 | 337/210 |
| 5,582,226 A * | 12/1996 | Voss | ........................ E06B 9/303 | 160/168.1 R |
| 6,792,996 B1 * | 9/2004 | Yu | ........................... E06B 9/386 | 160/178.3 |
| 7,556,080 B2 * | 7/2009 | Nien | ......................... E06B 9/30 | 160/168.1 R |
| 2002/0133956 A1 * | 9/2002 | Collins | ................ B27G 17/025 | 30/294 |

(Continued)

FOREIGN PATENT DOCUMENTS

TW I320449 B 2/2010

*Primary Examiner* — Daniel P Cahn
*Assistant Examiner* — Matthew R. Shepherd
(74) *Attorney, Agent, or Firm* — Muncy, Geissler, Olds & Lowe, P.C.

(57) ABSTRACT

A window blind includes an upper beam and a lower beam linked by two ladder-like ropes. The ladder-like rope has a front vertical portion, a rear vertical portion, transverse portions connected between the vertical portions, first ring portions connected to the front vertical portion, second ring portions connected to the rear vertical portion, and third ring portions connected to the front vertical portion. The transverse portion supports a slat from below. The slat has two ends thereof each provided with a through hole and a slot communicated with the through hole. To assemble the slat, the third ring portion of the ladder-like rope has one segment inlaid into the through hole of the slat through the slot, and then the third ring portion is mounted around the front edge of the slat. Also disclosed is a method for assembling the slats of the window blind.

10 Claims, 7 Drawing Sheets

(56) References Cited

U.S. PATENT DOCUMENTS

| | | | | |
|---|---|---|---|---|
| 2003/0127197 | A1* | 7/2003 | Lai | E06B 9/384<br>160/115 |
| 2005/0211393 | A1* | 9/2005 | Yu | E06B 9/30<br>160/168.1 R |
| 2012/0175068 | A1* | 7/2012 | Cleaver | E06B 9/384<br>24/115 F |
| 2015/0075728 | A1* | 3/2015 | Tachikawa | E06B 9/303<br>29/24.5 |
| 2018/0112460 | A1* | 4/2018 | Huang | E06B 9/303 |

* cited by examiner

WINDOW BLIND AND METHOD FOR ASSEMBLING SLATS THEREOF

BACKGROUND OF THE INVENTION

1. Technical Field

The present invention relates to window blinds, and more particularly to a window blind that is structurally simple and easy to assemble. Also disclosed is a method for assembling slats of the window blind.

2. Description of Related Art

Taiwan Patent Publication No. 1320449 discloses a window blind that has a plurality of connecting members. Each of the connecting members passes through the through holes formed on the slats from above, and each of the connecting members has its first end connected to the rear vertical portion of the ladder-like rope. The second of the connecting member is formed with a loop or knot that allows a lifting cord to pass therethrough, so that the lifting cord can only move vertically but not transversely. In addition, the second end of the connecting member after passing through the through hole of the slat can be fixed using a fixing portion formed by a metal sheet or a knot to prevent the second end of the connecting member from coming off the slat upwardly.

In the prior patent, however, while the connecting member is flexible, the small through hole makes it time-consuming to pass the connecting member through the through hole from above. Besides, after the time-consuming threading operation, there is an additional step to use the metal sheet to hold the second end of the connecting member or to knot the second end of the connecting member, making the overall assembling work more difficult. Once any of the assembled slats gets damaged and needs to be replaced, it is necessary to detach the metal sheet or unknot the second end before taking further maintenance or repair actions. Hence, the prior patent is not perfect in terms of assembling, design and operation, and improvement is therefore desirable.

BRIEF SUMMARY OF THE INVENTION

The primary objective of the present invention is to provide a window blind that is structurally simple and easy to assemble, in which its slats are prevented from excessive transverse displacement.

To achieve the foregoing objective, the window blind of the present invention comprises an upper beam, a lower beam, two ladder-like ropes, two pairs of lifting cords, and a plurality of slats. The two ladder-like rope are connected between the upper beam and the lower beam and each have a front vertical portion, a rear vertical portion, a plurality of transverse portions, a plurality of first ring portions, a plurality of second ring portions, and a plurality of third ring portions. The front vertical portion and the rear vertical portion are parallel to each other. The plural transverse portions are vertically equidistant and connected between the front vertical portion and the rear vertical portion. The plural first ring portions are vertically equidistant and connected to the front vertical portion. The plural second ring portions are vertically equidistant and connected to the rear vertical portion. The plural third ring portions are vertically equidistant and connected to the front vertical portion and the plural third ring portions and the plural first ring portions are located at two opposite sides of the front vertical portion.

Two pairs of lifting cords extend downward from the upper beam and have their bottoms connected to the lower beam. One said lifting cord of each said pair passes through the plural first ring portions of one said ladder-like rope, the other lifting cord of each said pair passes through the plural second ring portions of one said ladder-like rope. The plural slats are connected between the upper beam and the lower beam and mounted on the transverse portions of the two ladder-like ropes, respectively. Each of the slats has two ends thereof each provided with a through hole and a slot, the through hole being adjacent to a front edge of the slat and receiving one segment of the third ring portion of one said ladder-like rope, so that the front edges of the slats are mounted around and linked together by the third ring portions of the ladder-like ropes. The slot extends from one side of the slat and is communicated with the through hole and allows the segment of the third ring portion of one said ladder-like rope to pass therethrough.

It is thus clear from the above that, with the through holes and the slots of the slats, the window blind of the present invention can have the ladder-like ropes assembled with the slats conveniently and firmly without using other components, Meanwhile, to replace any damaged slats, the slats can be easily disassembled from the ladder-like ropes.

Preferably, the slot extends from the front edge of the slat to be communicated with the through hole. Thereby, the segment of the third ring portion of the ladder-like rope is inlaid into the slot of the slat from the front edge of the slat, and then inlaid into the through hole of the slat along the slot of the slat, thereby accomplishing assembly of the slat.

Preferably, the slot of the slat has a first extending segment and a second extending segment perpendicular to the first extending segment. The first extending segment extends from the front edge of the slat in a width direction of the slat to a rear edge of the slat, and the second extending segment extends from one end of the first extending segment in a length direction of the slat to the through hole and is communicated with the through hole. Thereby, the segment of the third ring portion of the ladder-like rope is inlaid into the first extending segment of the slot of the slat from the front edge of the slat, and then moves along the second extending segment of the slot of the slat, and is eventually inlaid into the through hole of the slat from the second extending segment of the slot of the slat, thereby accomplishing assembly of the slat.

Preferably, the through hole has a round cross-section, and the through hole is located between the front edge of the slat and the second extending segment of the slot, so that the through hole is tangent to the second extending segment of the slot. This prevents the segment of the third ring portion of the ladder-like rope in the through hole from moving into the slot and accidentally coming off the slat.

Preferably, the two slots are arranged as being transversely symmetrical.

Preferably, the first ring portion is equal to the second ring portion in terms of size and is smaller than the third ring portion in terms of size.

Preferably, the first ring portion and the second ring portion are in a front/rear-opposite arrangement, and the first ring portion and the third ring portion are in a staggered arrangement along an extending direction of the front vertical portion.

Another objective of the present invention is to provide a method for assembling the slats of the aforementioned window blind, which involves mounting one said slat on the transverse portions of the two ladder-like ropes; and inlaying the segment of the third ring portion of each said ladder-like rope into the slot of the slat, and inlaying the segment to the through hole of the slat through the slot of the slat, so that the front edges of the slats are linked together by third ring portions of the ladder-like rope.

The present invention will be described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

DETAILED DESCRIPTION OF THE INVENTION

Figure 1:
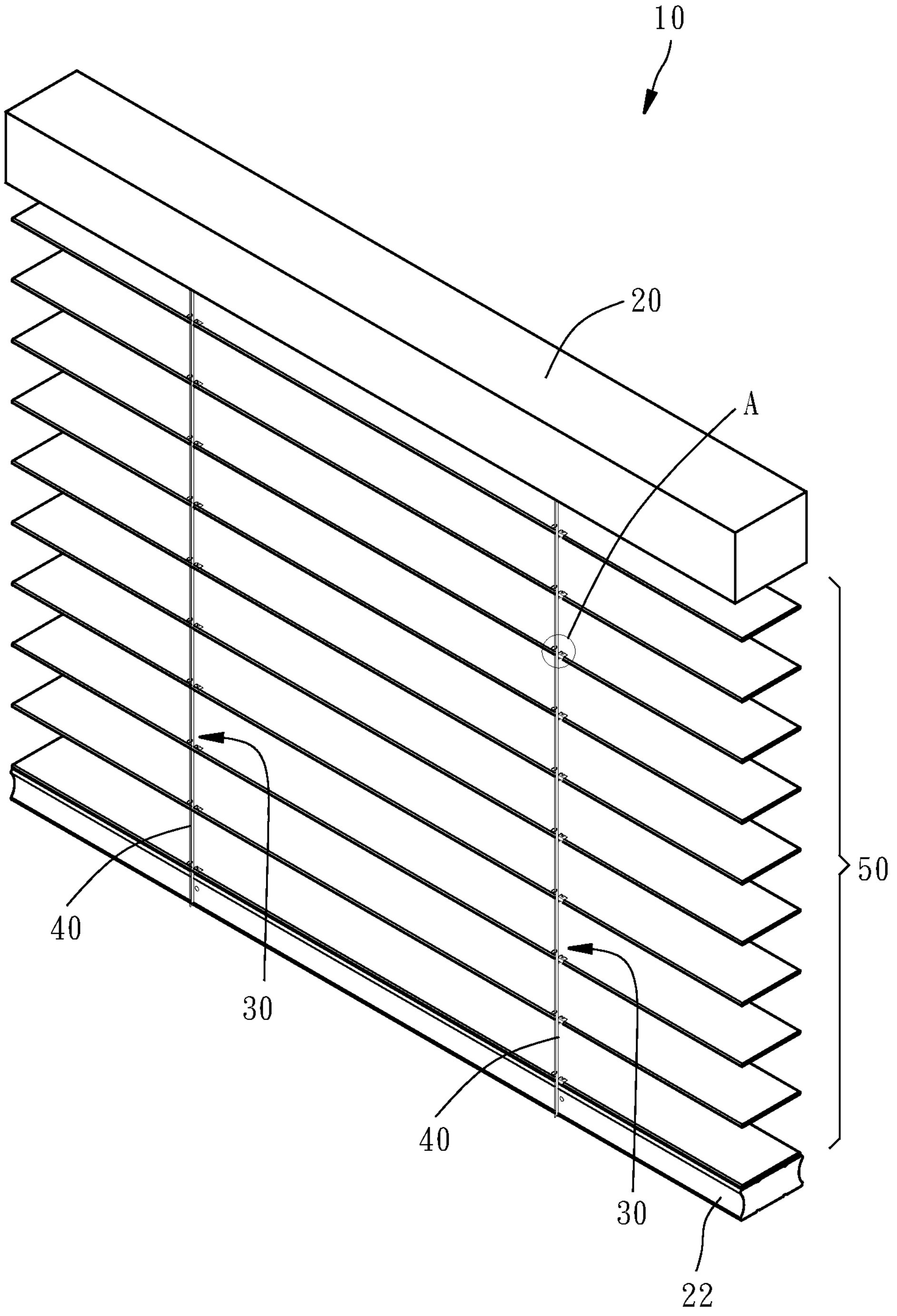
FIG. 1 is a perspective view of a window blind of the present invention.

The following preferred embodiments when read with the accompanying drawings are made to clearly exhibit the above-mentioned and other technical contents, features and effects of the present invention. It is to be noted first that throughout this document, including embodiments described herein and the appended claims, all the directional terms shall be interpreted based on the directions as the relevant components shown in the drawings. Unless otherwise noted, like elements will be identified by identical numbers throughout all figures.

Referring to FIG. 1, a window blind 10 of the present invention comprises an upper beam 20, a lower beam 22, two ladder-like ropes 30, two pairs of lifting cords 40, and a plurality of slats 50 (with a number not limited herein).

The upper beam 20 and the lower beam 22 are arranged in an up/down-opposite arrangement.

Figure 4:
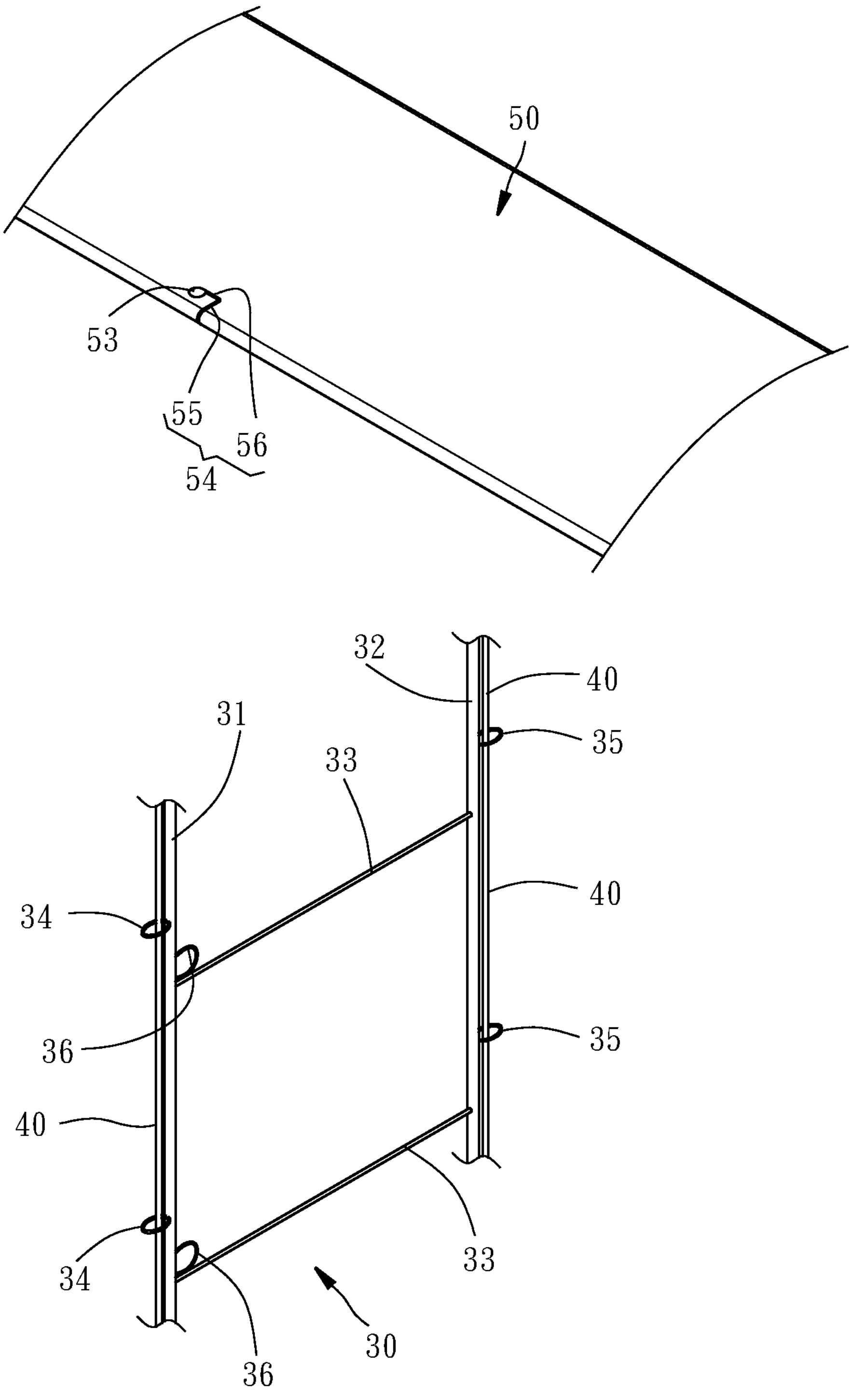
FIG. 4 is a partial, exploded view of the window blind of the present invention.
Figure 5:
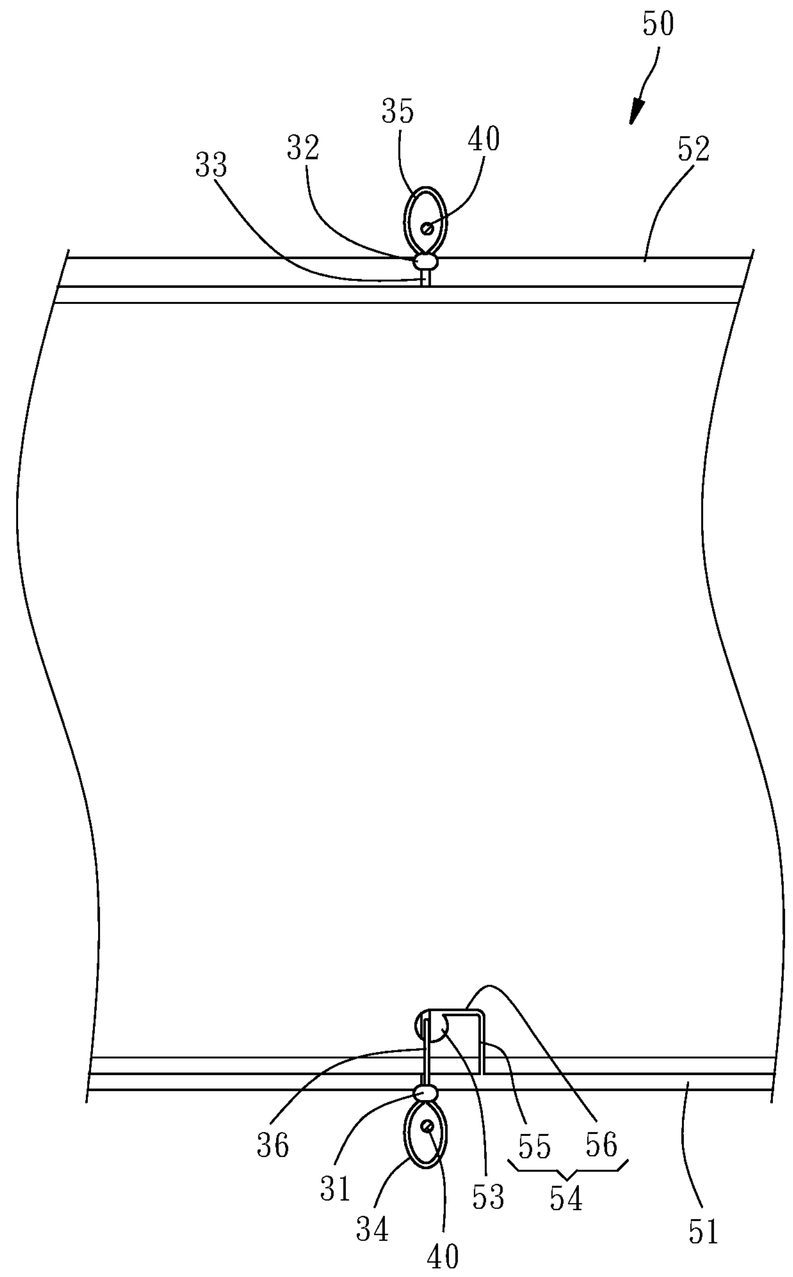
FIG. 5 is a partial, top view of the window blind of the present invention.
Figure 6:
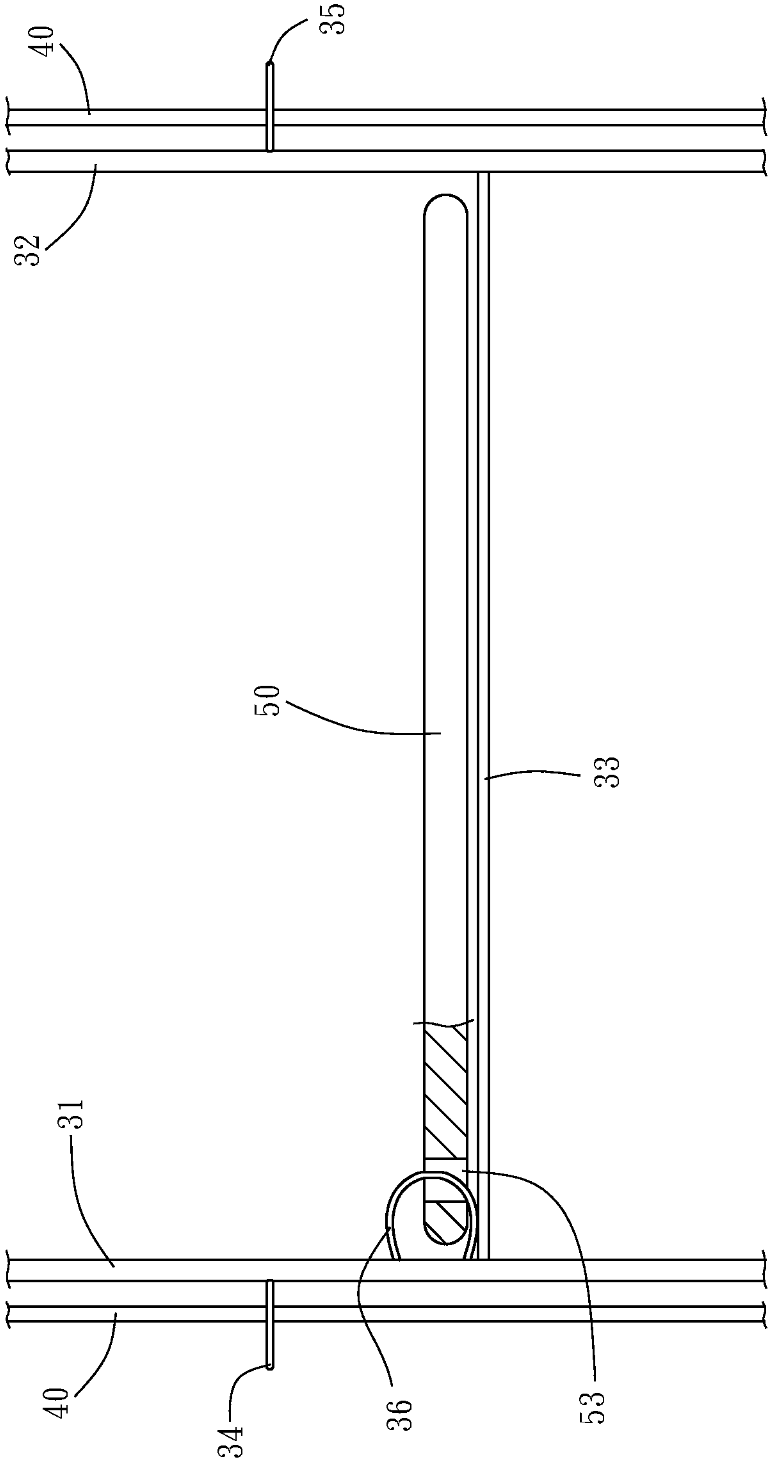
FIG. 6 is a partial, cross-sectional view of the window blind of the present invention.

The two ladder-like ropes 30 are connected between the upper beam 20 and the lower beam 22. Each of the ladder-like ropes 30 has a front vertical portion 31, a rear vertical portion 32, a plurality of transverse portions 33, a plurality of first ring portions 34, a plurality of second ring portions 35 and a plurality of third ring portions 36. The transverse portions 33, the first ring portions 34, the second ring portions 35 and the third ring portions 36 are each quantitatively equal to the slats 50. Also referring to FIG. 4 through FIG. 6, the front vertical portion 31 and the rear vertical portion 32 are parallel to each other, and both have their respective tops extending into the upper beam 20 to combined with a shared angle adjusting mechanism (not shown) for adjusting the tilt angle of the slats 50. Since the angle adjusting mechanism is known in the prior art and is not the characteristic of the present invention, the details thereof is omitted herein. The transverse portions 33 are connected between the front vertical portion 31 and the rear vertical portion 32 by means of sewing or weaving, and are vertically equidistant. The first ring portions 34 are connected to the front side of the front vertical portion 31 by means of sewing or weaving, and are vertically equidistant. The second ring portions 35 are connected to the rear side of the rear vertical portion 32 by means of sewing or weaving, and are vertically equidistant. In addition, as shown in FIG. 4 through FIG. 6, the first ring portion 34 and the second ring portion 35 are in a front/rear-opposite arrangement, and the first ring portion 34 is equal to the second ring portion 35 in terms of size. The third ring portions 36 are connected to the rear side of the front vertical portion 31, and are vertically equidistant. The third ring portions 36 and the first ring portions 34 are in a staggered arrangement along an extending direction of the front vertical portion 31. Additionally, as shown in FIG. 4, the third ring portion 36 is greater than both the first ring portion 34 and the second ring portion 35 in terms of size.

The two pairs of lifting cords 40 have their respective tops extending into the upper beam 20 to combined with a shared altitude adjusting mechanism (not shown) for adjusting the altitude of the slats 50. Since the altitude adjusting mechanism is known in the prior art and is not the characteristic of the present invention, the details thereof is omitted herein. The two pairs of lifting cords 40 have their respective bottoms connected to the lower beam 22, so that the lower beam 22 can be lifted with the two pairs of lifting cords 40 are pulled. In addition, as shown in FIG. 5 and FIG. 6, in each pair of the lifting cords 40, one cord passes through the first ring portions 34 of the ladder-like rope 30, and the other cord passes through the second ring portions 35 of the ladder-like rope 30, so that each pair of the lifting cords 40 can only move vertically but not transversely.

Figure 2:
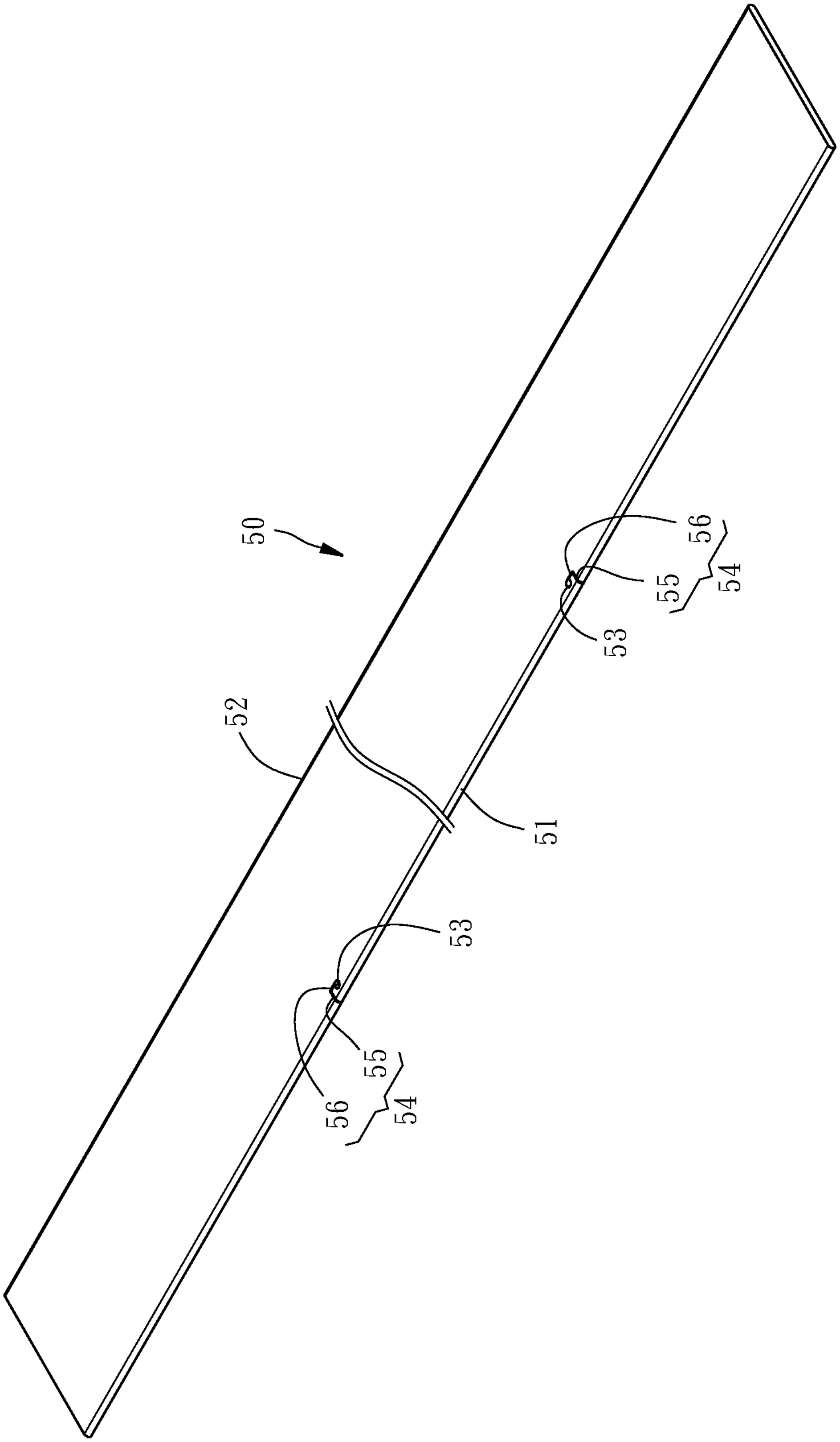
FIG. 2 is a perspective view of a slat of the window blind of the present invention.
Figure 3:
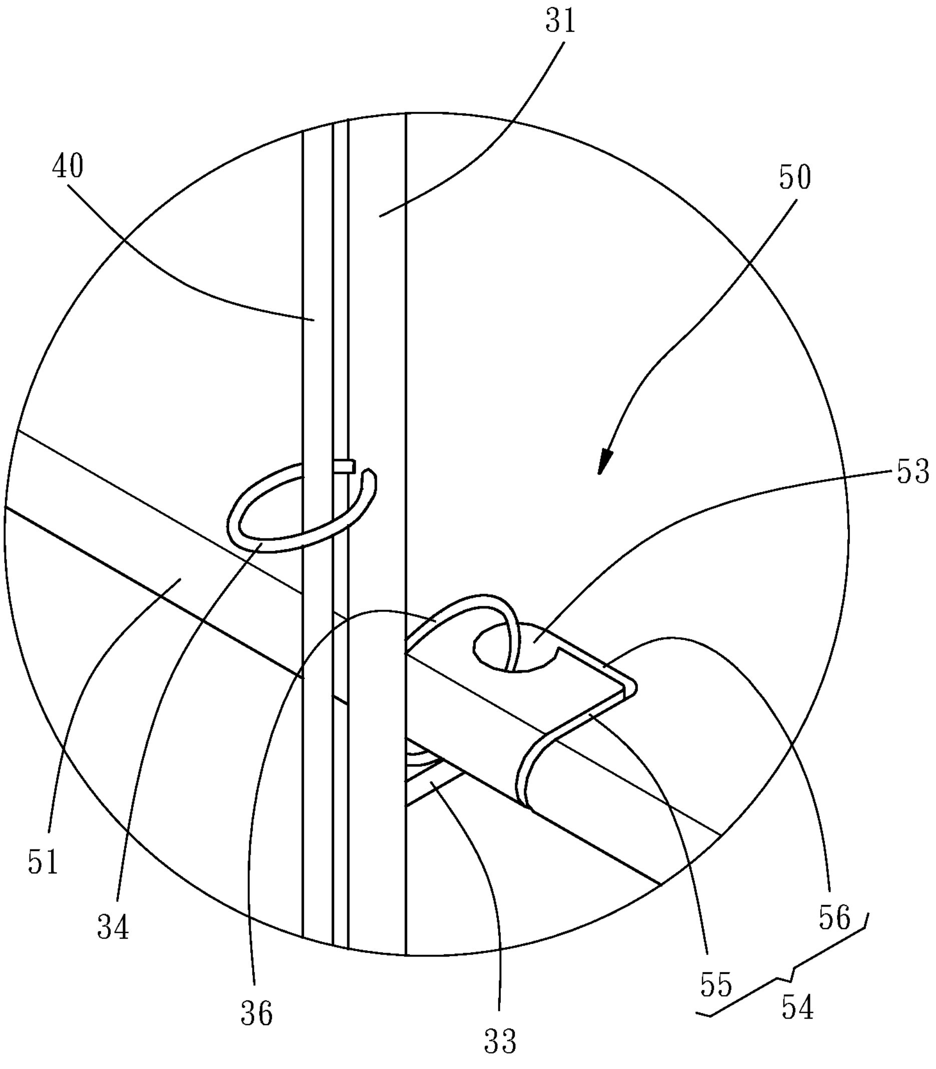
FIG. 3 is an enlarged view of Circle A of FIG. 1.

The slats 50 are arranged between the upper beam 20 and the lower beam 22 and are parallel to each other. As shown in FIG. 5 and FIG. 6, each of the slats 50 is mounted on the transverse portions 33 of the two ladder-like ropes 30. The front edge 51 of the slat 50 is adjacent to the front vertical portions 31 of the two ladder-like ropes 30, and the rear edge 52 of the slat 50 is adjacent to the rear vertical portions 32 of the two ladder-like ropes 30. In addition, as shown in FIG. 2 through FIG. 4, the slat 50 has its two ends each provided with a through hole 53 and a slot 54. The through hole 53 is close to the front edge 51 of the slat 50 and has a round cross-section. The two slots 54 at the two ends are formed symmetrically. Each of the slots 54 has a reversed-L shape, composed of a first extending segment 55 and a second extending segment 56 perpendicular to the first extending segment 55. The first extending segment 55 of the slot 54 extends from the front edge 51 of the slat 50 in the width direction of the slat 50 to the rear edge 52 of the slat 50. The second extending segment 56 of the slot 54 extends from the first extending segment 55 in the length direction of the slat 50 to the through hole 53. The through hole 53 is located between the front edge 51 of the slat 50 and the second extending segment 56 of the slot 54 and is tangent to and communicated with the second extending segment 56 of the slot 54.

To assemble the ladder-like rope 30 and the slat 50, as shown in FIG. 4 through FIG. 6, the slat 50 is first mounted on the transverse portions 33 of the two ladder-like ropes 30, and one segment of the third ring portion 36 of the ladder-like rope 30 is inlaid into the first extending segment 55 of the slot 54 of the slat 50 from the opening formed by the first extending segment 55 of the slot 54 of the slat 50 at the front edge 51 of the slat 50. Then the segment is moved to the second extending segment 56 of the slot 54 from the first extending segment 55 of the slot 54, and passes through the through hole 53 of the slat 50 from the second extending segment 56 of the slot 54, so that the third ring portion 36 of the ladder-like rope 30 is mounted around the front edge 51 of the slat 50. As the ladder-like rope 30 and the slat 50 are such assembled, the slat 50 is prevented from excessive transverse displacement. Since the through hole 53 and the second extending segment 56 of the slot 54 are in a tangent relationship, and the slot 54 is in a reversed-L shape, even when the assembled slat 50 is lifted, lowered or tilted, the segment of the third ring portion 36 of the ladder-like rope 30 inlaid in the through hole 53 is unlikely to move into the second extending segment 56 of the slot 54, thereby effectively preventing the third ring portion 36 of the ladder-like rope 30 from accidentally coming off the slat 50.

Replacement of a damaged slat 50 can be easily achieved by pulling the segment of the third ring portion 36 of the ladder-like rope 30 inlaid in the through hole 53 of the damaged slats 50 out of the through hole 53 through the slot 54, and having a new slat 50 assembled with the third ring portion 36 of the ladder-like rope 30 as described above. The replacement is simple and rapid.

Figure 7:
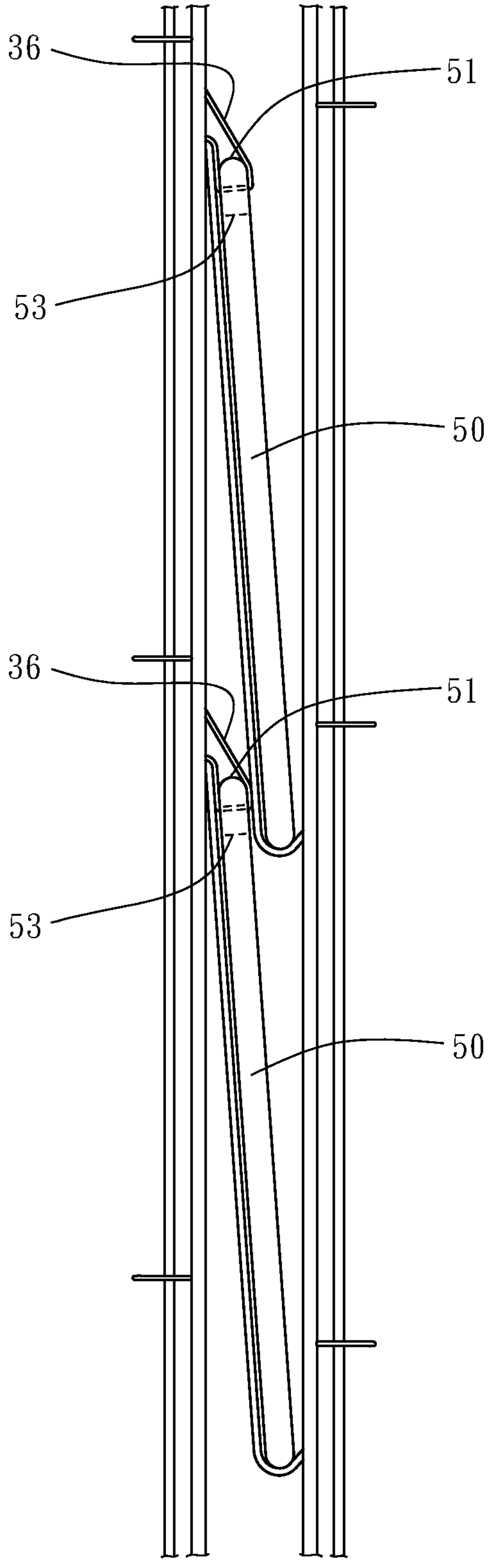
FIG. 7 is similar to FIG. 6, showing the slats tilted.

Moreover, as shown in FIG. 7, since the through hole 53 is located at the front edge 51 of the slat 50, when all the slats 50 are tilted up or down, the through holes 50 can be covered by the overlapped portion of two adjacent slats 50, so that the through holes 50 are hindered from sight, thereby ensuring the blind's aesthetic and users' privacy. Furthermore, since the third ring portion 36 is made of a relatively thin rope, each two adjacent slats 50 when tilted up or down can be more close to each other, thereby minimizing the interval therebetween that may allow light to leak in, and in turn improving the light-shading effect of the blind.

It is thus clear from the above that, with the through holes 53 and the slots 54 of the slats 50, the window blind 10 of the present invention can have the ladder-like ropes 30 assembled with the slats 50 conveniently and firmly without using any knot or other components, Meanwhile, to replace any damaged slats 50, the slats 50 can be easily disassembled from the ladder-like ropes 30.

What is claimed is:

1. A window blind, comprising:

an upper beam;

a lower beam, located below the upper beam;

two ladder ropes, connected between the upper beam and the lower beam, each said ladder rope having a front vertical portion, a rear vertical portion, a plurality of transverse portions, a plurality of first ring portions, a plurality of second ring portions, and a plurality of third ring portions, the front vertical portion and the rear vertical portion being parallel to each other, the plurality of transverse portions being vertically equidistant and connected between the front vertical portion and the rear vertical portion, the plurality of first ring portions being vertically equidistant and connected to the front vertical portion, the plurality of second ring portions being vertically equidistant and connected to the rear vertical portion, the plurality of third ring portions being vertically equidistant and connected to the front vertical portion so that the plurality of third ring portions and the plurality of first ring portions are located at two opposite sides of the front vertical portion;

two pairs of lifting cords, extending downward from the upper beam and having bottoms of the two pairs of lifting cords connected to the lower beam, one said lifting cord of each said pair passing through the plurality of first ring portions of one of said ladder ropes, the other lifting cord of each said pair passing through the plurality of second ring portions of the one of said ladder ropes; and a plurality of slats being parallel to each other, connected between the upper beam and the lower beam and mounted on the transverse portions of the two ladder ropes, respectively, each of said slats having two ends thereof each provided with a through hole and a slot, each through hole being adjacent to a front edge of a corresponding one of said slats and receiving one segment of the corresponding third ring portion of one of said ladder ropes, so that the front edges of the slats are linked together by the third ring portions of the ladder ropes, each slot extending from one side of the corresponding slat and being communicated with the corresponding through hole and allowing the segment of the corresponding third ring portion of the one of said ladder ropes to pass therethrough, wherein each slot extends from the front edge of the corresponding slat to be communicated with the corresponding through hole, wherein each slot has a first extending segment and a second extending segment that is perpendicular to the first extending segment, the first extending segment extending from the front edge of the corresponding slat in a width direction of the corresponding slat to a rear edge of the corresponding slat, and the second extending segment extending from one end of the first extending segment in a length direction of the corresponding slat to the through hole and is communicated with the corresponding through hole, wherein each through hole has a round cross-section, and each through hole is located between the front edge of the corresponding slat and the second extending segment of the corresponding slot, so that each through hole is tangent to the corresponding second extending segment of the corresponding slot, a length of the first extending segment of each slot in the width direction of the corresponding slat being formed of a diameter of the corresponding through hole and a distance between the corresponding through hole and the front edge of the corresponding slat in the width direction of the corresponding slat, wherein one end of the segment of each third ring portion is fixed to the one of said ladder ropes at a first position above a top surface of the corresponding slat, and the other end of the segment of each third ring portion passes through the corresponding through hole from one side of the corresponding slat to another side of the corresponding slat, extends, in the width direction of the corresponding slat, through a space between the corresponding slat and the corresponding transverse portion, and then fixed to the one of said ladder ropes at a second position spaced apart from the first position and below the top surface of the corresponding slat when the corresponding slat is not tilted and is perpendicular to the one of said ladder ropes, and wherein each first ring portion is fixed to the one of said ladder ropes at a third position above the top surface of the corresponding slat that is closest thereto when the corresponding slat is not tilted and is perpendicular to the one of said ladder ropes, and above the first position of the corresponding third ring portion that is closest thereto and passes through the corresponding slat.

2. The window blind of claim 1, wherein the two slots of each slat are arranged as being transversely symmetrical.

3. The window blind of claim 1, wherein the first ring portions are equal to the second ring portions in terms of size and are smaller than the third ring portions in terms of size.

4. The window blind of claim 1, wherein the first ring portions and the second ring portions are in a front/rear-opposite arrangement.

5. The window blind of claim 1, wherein the first ring portions and the third ring portions are in a staggered arrangement along an extending direction of the front vertical portion.

6. A method of assembling the slats of the window blind of claim 1, comprising steps of:

a) mounting the plurality of slats on the transverse portions of the two ladder ropes; and b) inlaying the segment of each third ring portion into the slot of the corresponding slat, and inlaying the segment to the corresponding through hole of the corresponding slat through the corresponding slot of the corresponding slat, so that each third ring portion of the ladder rope is mounted around the front edge of the corresponding slat, wherein each slot extends from the front edge of the corresponding slat to be communicated with the corresponding through hole, wherein each slot has a first extending segment and a second extending segment that is perpendicular to the first extending segment, the first extending segment extending from the front edge of the corresponding slat in a width direction of the corresponding slat to a rear edge of the corresponding slat, and the second extending segment extending from one end of the first extending segment in a length direction of the corresponding slat to the through hole and is communicated with the corresponding through hole, wherein each through hole has a round cross-section, and each through hole is located between the front edge of the corresponding slat and the second extending segment of the corresponding slot, so that each through hole is tangent to the corresponding second extending segment of the corresponding slot, a length of the first extending segment of each slot in the width direction of the corresponding slat being formed of a diameter of the corresponding through hole and a distance between the corresponding through hole and the front edge of the corresponding slat in the width direction of the corresponding slat, wherein one end of the segment of each third ring portion is fixed to the one of said ladder ropes at a first position above a top surface of the corresponding slat, and the other end of the segment of each third ring portion passes through the corresponding through hole from one side of the corresponding slat to another side of the corresponding slat, extends, in the width direction of the corresponding slat, through a space between the corresponding slat and the corresponding transverse portion, and then fixed to the one of said ladder ropes at a second position spaced apart from the first position and below the top surface of the corresponding slat when the corresponding slat is not tilted and is perpendicular to the one of said ladder ropes, and wherein each first ring portion is fixed to the one of said ladder ropes at a third position above the top surface of the corresponding slat that is closest thereto when the corresponding slat is not tilted and is perpendicular to the one of said ladder ropes, and above the first position of the corresponding third ring portion that is closest thereto and passes through the corresponding slat.

7. The method of claim 6, wherein the two slots of each slat are arranged as being transversely symmetrical.

8. The method of claim 6, wherein the first ring portion is equal to the second ring portion in terms of size and is smaller than the third ring portion in terms of size.

9. The method of claim 6, wherein the first ring portion and the second ring portion are in a front/rear-opposite arrangement.

10. The method of claim 6, wherein the first ring portion and the third ring portion are in a staggered arrangement along an extending direction of the front vertical portion.

* * * * *